United States Patent

[11] 3,589,402

| | | | |
|---|---|---|---|
| [72] | Inventor | Wilbert T. Buck | |
| | | Morris Plains, N.J. | |
| [21] | Appl. No. | 802,683 | |
| [22] | Filed | Feb. 26, 1969 | |
| [45] | Patented | June 29, 1971 | |
| [73] | Assignee | Westinghouse Electric Corporation | |
| | | Pittsburgh, Pa. | |

[54] INK FEED TUBING
3 Claims, 1 Drawing Fig.

[52] U.S. Cl. ............................................. 138/137,
138/177, 138/145
[51] Int. Cl. ......................................... F16l 11/04
[50] Field of Search ............................... 138/137,
140, 145, 146, 177, DIG. 7

[56] References Cited
UNITED STATES PATENTS

| 2,456,454 | 12/1948 | Signer | 138/DIG. 7 |
|---|---|---|---|
| 2,474,897 | 7/1949 | Hauser | 138/DIG. 7 |
| 2,525,272 | 10/1950 | Rhotors | 138/137 X |
| 2,645,249 | 7/1953 | Davis et al. | 138/137 X |
| 2,729,618 | 1/1956 | Muller | 138/DIG. 7 |
| 3,420,679 | 1/1969 | Gifford | 138/DIG. 7 |

Primary Examiner—Herbert F. Ross
Attorneys—A. T. Stratton, C. L. Freedman and J. L. Stoughton ABSTRACT: A sealed inking system recording instrument having an ink supplying tube connecting the ink reservoir to the movable recording pen which tube is impervious to air and ink and retains its flexibility at temperature which extend from a temperature well below zero to temperatures of 120° F. and above.

PATENTED JUN29 1971　　　　　　　　　　　3,589,402
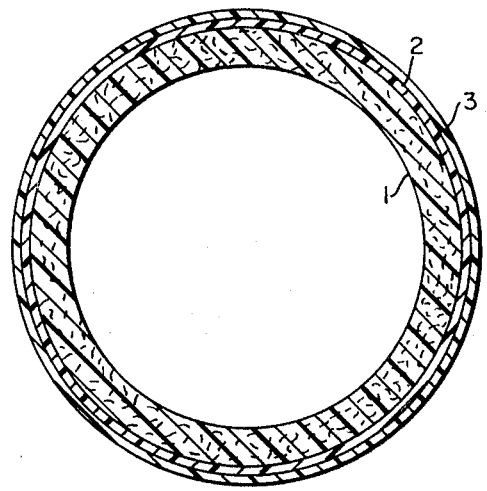
INVENTOR
Wilbert T. Buck
ATTORNEY

INK FEED TUBING

CROSS-REFERENCES TO RELATED APPLICATIONS

This invention relates to recording instruments of the type using a sealed inking system and especially the type similar to that shown in U.S. Pat. No. 3,136,597 to S. G. Hayter. The inking system is also similar to that shown in U.S. Pat. No. 2,820,689 to J. J. Holloway.

BACKGROUND OF THE INVENTION

Recording instruments have previously been constructed to record electrical quantities such as voltage and current. In such instruments a measuring device including a movable part is provided for actuating a suitable marking device, such as a pen, which records, on a suitable chart, the magnitudes of the measured quantity over a desired time period.

The pen must be provided with a supply of ink to make the record on the chart. One way of accomplishing this in the past was by connecting a fixedly positioned ink container to the pen with a length of flexible tubing as is illustrated by the Holloway U.S. Pat. No. 2,820,689. With tubing as taught by Holloway trouble has been encountered because of insufficient flexibility of the tubing over the ambient temperature range in which the instrument is used. This problem is particularly troublesome in instruments employing a pen which is directly connected to the movable part of the measuring device. As for example a direct-acting instrument of the type shown by Hayter. In such direct-acting instruments relatively low values of torque are applied to the pen as compared to the torque applied in the instruments of the indirect-acting type wherein torque-amplifying devices, such as linkages, are interposed between the pen and the movable part.

When flexible tubing as set forth by Holloway is utilized in recording instruments of the direct-acting type the flexing of the tubing utilizes an appreciable percentage of the total torque applied to the pen. Furthermore the power to flex the tubing depends not only upon the flexibility characteristics of the tubing but upon its temperature as well. It is therefore desirable that the tubing employed be extremely flexible. It is further desirable that the tubing exhibit a very low permeability such that the entry of air or other gases inwardly through the tubing wall and the escape of ink outwardly will be minimized.

Flexible tubing as utilized in recording instruments of the direct-acting type, should have a flexibility which is substantially independent of the temperature. Tubing of the prior art, as for example that shown in the Hayter U.S. Pat. No. 3,136,597 needed to be heated and as illustrated in said Hayter patent a heating current has passed through the coil positioning spring (identified by the reference character 22 in the said Hayter patent) to increase the temperature of the reduced diameter flexible portion of the ink-supplying tube so that it remained sufficiently flexible. Tests have shown that without the heating of the flexible tubing a tubing temperature of 20° F. produces approximately 5 percent error, a tubing temperature of 0° F. produces a 10 percent error and temperature degrees of −10° F. and below produces such a large error that the recording instrument is rendered inoperable.

SUMMARY OF THE INVENTION

According to the present invention an ink feed tubing system of improved construction is provided for supplying ink to a pen assembly from an ink container in which the tubing portion will retain sufficient flexibility so that the instrument may be used without a substantial error being introduced by a change in flexibility of the tubing at a temperature as low as −40° F. and which tubing will at the same time retain its imperviousness to air at elevated temperatures as great as 120° F. and above.

Applicant's tubing is useful in instruments having a construction similar to that shown in the Hayter patent and while the tubing may have a reduced central section as illustrated in the Hayter construction, it does not necessarily have the reduced section and the diameter of the flexible tubing which conducts the ink from the sac to the movable pen may be of substantially constant diameter. I have found that tubing fabricated in accordance with this invention may have an outer diameter of 0.053 inches and an inner diameter or bore of 0.024 inches throughout its length which is similar to the tubing end portions as used in the Hayter patent. I have thereby not only eliminated the necessity for drawing and reducing the diameter and the intermediate flexible section at the cost thereof but have provided a tubing of such flexibility, that it is unnecessary to provide the electrical circuit and the associated structure for heating the flexing intermediate portion of the tubing.

The tubing used by Hayter was vinylidene chloride which has a superior vapor transmission characteristic and is impervious to prevent air from passing into the ink and forming bubbles therein. This tubing functioned well at normal and elevated temperatures but at low temperatures it stiffened sufficiently to cause errors in the readings and was subject to cracking and splitting as it flexed unless some heating means as indicated above was used.

Tubing extruded of various materials such as TFE, polyethylene, polyurethane, plasticized vinyl and assorted rubber compounds were evaluated at low temperatures for stiffness and permeability. A soft flexible polyvinyl chloride tubing 1 having a Shore A Durometer hardness of 60—64 a tensile strength of 1,450—1,500 p.s.i. and an elongation of 400 percent was suitable from the flexibility standpoint, but its vapor imperviousness was poor and over a period of time bubbles were formed in the ink which prevented the pen from making the proper recording on the recording paper. The flexible tubing may be made from other vinyl polymers e.g. polyvinyl dichloride, copolymers of vinyl chloride and other vinyl monomers so long as it retains its flexibility throughout the temperature range.

In accordance with this invention the permeability problem is overcome by applying at least one and preferably two continuous coatings of a solution of finely divided solid resinous copolymer of vinylidene chloride and acrylonitrile containing sufficient acrylonitrile (in the order of 15 percent by weight) to facilitate solubility in ketone solvents. A combination of methyl ethyl ketone and methyl isobutyl ketone is a suitable solvent for the finely divided solid resinous copolymer. The solvent solution may have a composition of 51 to 100 grams of the heretofore-described vinylidene copolymer, 200 milliliters of methyl ethyl ketone and 800 milliliters of methyl isobutyl ketone. The solution should contain from about 5 to 10 percent of the copolymer on a solids weight basis. It has been found that with a solids content above 10 percent the viscosity increases and makes the application of the composition to the tubing difficult. Other resinous coating materials may be employed so long as they have high gas and moisture impermeability and do not, in solid or solution form, adversely effect the tubing.

The tubing of suitable material and dimension is preferably coated by dipping it into a quantity of the solution of the coating material as above-identified and permitted to dry to form a layer 2. Preferably the tubing is redipped and permitted to dry again to apply a second coating 3 of the coating material to the tubing. The figure of the drawing is greatly enlarged and is not intended to show the thicknesses of the tubing 1 and coatings 2 and 3 in proportion.

Tests have shown that tubing of plasticized vinyl so coated with this material is sufficiently impervious to prevent the development of bubbles in an operating range of from −40° F. to 120° F. and retains sufficient flexibility to operate with no measurable error at a temperature as low as −25° F., and maintaining an error not in excess of 3 percent at a temperature as low as −40° F.

What I claim and desire to be secured by United States Letters Patent is as follows:

1. An ink-conveying conduit for a recording instrument comprising a thin soft highly flexible tube having a Shore A Durometer hardness less than about 64, said tube being substantially nonresilient at and maintaining its flexibility at temperatures substantially below 0° F., and a resinous coating deposited on said tube, said coating having a high gas impermeability and being substantially nonresilient at and highly flexible at temperatures substantially below 0° F. and in which said resinous coating consists substantially only of a copolymer of vinylidene chloride and acrylonitrile.

2. The combination of claim 1 in which said copolymer includes acrylonitrile in the order of 15 percent by weight.

3. The combination of claim 2 in which said tube has a tensile strength of not less than 1,450—1,500 pounds per square inch with an elongation of not more than 400 percent.